(12) United States Patent
Maier

(10) Patent No.: US 8,062,400 B2
(45) Date of Patent: Nov. 22, 2011

(54) DUAL BODY DRUM FOR ROTARY SEPARATORS

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 387 days.

(21) Appl. No.: 12/215,068

(22) Filed: Jun. 25, 2008

(65) Prior Publication Data

US 2009/0321343 A1 Dec. 31, 2009

(51) Int. Cl.
*B01D 46/18* (2006.01)
(52) U.S. Cl. ............... 55/400; 55/406; 55/407; 55/408; 95/270; 210/787; 210/512.1; 210/360.1
(58) Field of Classification Search ............ 55/400, 55/406–408; 95/270; 210/338, 342, 359, 210/360.1, 378, 402
See application file for complete search history.

(56) References Cited

U.S. PATENT DOCUMENTS

| 815,812 | A | | 3/1906 | Gow |
|---|---|---|---|---|
| 1,057,613 | A | * | 4/1913 | Baldwin .................. 95/218 |
| 1,061,656 | A | * | 5/1913 | Black ...................... 494/74 |
| 1,480,775 | A | | 1/1924 | Marien |
| 1,622,768 | A | | 3/1927 | Cook et al. |
| 1,642,454 | A | | 9/1927 | Malmstrom |
| 2,006,244 | A | | 6/1935 | Kopsa |
| 2,300,766 | A | | 11/1942 | Baumann |
| 2,328,031 | A | | 8/1943 | Risley |
| 2,345,437 | A | | 3/1944 | Tinker |
| 2,602,462 | A | | 7/1952 | Barrett |
| 2,811,303 | A | | 10/1957 | Ault et al. |
| 2,836,117 | A | | 5/1958 | Lankford |
| 2,868,565 | A | | 1/1959 | Suderow |
| 2,897,917 | A | | 8/1959 | Hunter |
| 2,932,360 | A | | 4/1960 | Hungate |
| 2,954,841 | A | | 10/1960 | Reistle |

(Continued)

FOREIGN PATENT DOCUMENTS

CA 2647511 10/2007

(Continued)

OTHER PUBLICATIONS

Technical Manual—High Pressure Air Compressor Model 13NL45; Naysea 86220-AT-MMA-010/93236, pp. 3-23 to 3-32, Electric Boat Corporation, Groton, CT 06340, Oct. 28, 1991..

(Continued)

*Primary Examiner* — Jason M Greene
*Assistant Examiner* — Dung Bui
(74) *Attorney, Agent, or Firm* — Edmonds & Nolte, PC

(57) ABSTRACT

A drum is for a rotary separator including a shaft rotatable about a central axis. The drum includes an inner drum member having inner and outer circumferential surfaces and being disposed generally about the shaft such that a first flow passage is generally defined between the inner drum member inner surface and the shaft. The inner drum inner surface is configured to separate liquids from a fluid flow contacting the surface. An outer drum member has inner and outer circumferential surfaces and is disposed generally about the inner drum member such that a second flow passage is generally defined between the outer drum member inner surface and the inner drum member outer surface, the second flow passage being generally coaxial with the first flow passage. Further, the outer drum inner surface is also configured to separate liquids from a fluid flow contacting the surface.

23 Claims, 5 Drawing Sheets

U.S. PATENT DOCUMENTS

| | | |
|---|---|---|
| 3,044,657 A | 7/1962 | Horton |
| 3,191,364 A | 6/1965 | Sylvan |
| 3,198,214 A | 8/1965 | Lorenz |
| 3,204,696 A | 9/1965 | De Priester et al. |
| 3,213,794 A | 10/1965 | Adams |
| 3,220,245 A | 11/1965 | Van Winkle |
| 3,273,325 A | 9/1966 | Gerhold |
| 3,352,577 A | 11/1967 | Medney |
| 3,395,511 A | 8/1968 | Ernst |
| 3,420,434 A | 1/1969 | Swearingen |
| 3,431,747 A | 3/1969 | Hasheimi et al. |
| 3,454,163 A | 7/1969 | Read |
| 3,487,432 A | 12/1969 | Jensen |
| 3,490,209 A | 1/1970 | Fernandes et al. |
| 3,500,614 A * | 3/1970 | Soo ................... 96/32 |
| 3,578,342 A | 5/1971 | Satterthwaite et al. |
| 3,628,812 A | 12/1971 | Larralde et al. |
| 3,672,733 A | 6/1972 | Arsenius et al. |
| 3,814,486 A | 6/1974 | Schurger |
| 3,829,179 A | 8/1974 | Kurita et al. |
| 3,915,673 A * | 10/1975 | Tamai et al. .............. 95/35 |
| 3,975,123 A | 8/1976 | Schibbye |
| 4,033,647 A | 7/1977 | Beavers |
| 4,059,364 A | 11/1977 | Andersen et al. |
| 4,078,809 A | 3/1978 | Garrick et al. |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson et al. |
| 4,146,261 A | 3/1979 | Edmaier et al. |
| 4,165,622 A | 8/1979 | Brown, Jr. |
| 4,174,925 A | 11/1979 | Pfenning et al. |
| 4,182,480 A * | 1/1980 | Theyse et al. ................ 494/14 |
| 4,197,990 A | 4/1980 | Carberg et al. |
| 4,205,927 A | 6/1980 | Simmons |
| 4,227,373 A | 10/1980 | Amend et al. |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,333,748 A | 6/1982 | Erickson |
| 4,334,592 A | 6/1982 | Fair |
| 4,336,693 A | 6/1982 | Hays et al. |
| 4,339,923 A | 7/1982 | Hays et al. |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman et al. |
| 4,391,102 A | 7/1983 | Studhalter et al. |
| 4,396,361 A | 8/1983 | Fraser |
| 4,432,470 A | 2/1984 | Sopha |
| 4,438,638 A | 3/1984 | Hays et al. |
| 4,441,322 A | 4/1984 | Ritzi |
| 4,442,925 A | 4/1984 | Fukushima et al. |
| 4,453,893 A | 6/1984 | Hutmaker |
| 4,463,567 A | 8/1984 | Amend et al. |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox et al. |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West et al. |
| 4,648,806 A | 3/1987 | Alexander |
| 4,687,017 A | 8/1987 | Danko et al. |
| 4,737,081 A | 4/1988 | Nakajima et al. |
| 4,752,185 A | 6/1988 | Butler et al. |
| 4,807,664 A | 2/1989 | Wilson et al. |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otteman |
| 5,024,585 A | 6/1991 | Kralovec |
| 5,043,617 A | 8/1991 | Rostron |
| 5,044,701 A | 9/1991 | Watanabe et al. |
| 5,045,046 A | 9/1991 | Bond |
| 5,054,995 A | 10/1991 | Kaseley et al. |
| 5,064,452 A | 11/1991 | Yano et al. |
| 5,080,137 A | 1/1992 | Adams |
| 5,190,440 A | 3/1993 | Maier et al. |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,246,346 A | 9/1993 | Schiesser |
| 5,285,123 A | 2/1994 | Kataoka et al. |
| 5,306,051 A | 4/1994 | Loker et al. |
| 5,337,779 A | 8/1994 | Fukuhara |
| 5,378,121 A | 1/1995 | Hackett |
| 5,385,446 A | 1/1995 | Hays |
| 5,421,708 A | 6/1995 | Utter |
| 5,443,581 A | 8/1995 | Malone |
| 5,484,521 A | 1/1996 | Kramer |
| 5,496,394 A | 3/1996 | Nied |
| 5,500,039 A | 3/1996 | Mori et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,575,309 A | 11/1996 | Connell |
| 5,585,000 A | 12/1996 | Sassi |
| 5,605,172 A | 2/1997 | Schubert et al. |
| 5,628,623 A | 5/1997 | Skaggs |
| 5,634,492 A | 6/1997 | Steinruck et al. |
| 5,640,472 A | 6/1997 | Meinzer et al. |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Satterthwaite et al. |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,750,040 A | 5/1998 | Hays |
| 5,775,882 A | 7/1998 | Kiyokawa et al. |
| 5,779,619 A | 7/1998 | Borgstrom et al. |
| 5,795,135 A | 8/1998 | Nyilas et al. |
| 5,800,092 A | 9/1998 | Nill et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,899,435 A | 5/1999 | Mitsch et al. |
| 5,935,053 A * | 8/1999 | Strid et al. ................ 494/66 |
| 5,938,803 A | 8/1999 | Dries |
| 5,938,819 A | 8/1999 | Seery |
| 5,946,915 A | 9/1999 | Hays |
| 5,951,066 A | 9/1999 | Lane et al. |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,980,218 A | 11/1999 | Takahashi et al. |
| 5,988,524 A | 11/1999 | Odajima et al. |
| 6,035,934 A | 3/2000 | Stevenson et al. |
| 6,059,539 A | 5/2000 | Nyilas et al. |
| 6,068,447 A | 5/2000 | Foege |
| 6,090,174 A | 7/2000 | Douma et al. |
| 6,090,299 A | 7/2000 | Hays et al. |

| Patent Number | Date | Inventor |
|---|---|---|
| 6,113,675 A | 9/2000 | Branstetter |
| 6,122,915 A | 9/2000 | Hays |
| 6,123,363 A | 9/2000 | Burgard et al. |
| 6,145,844 A | 11/2000 | Waggott |
| 6,149,825 A | 11/2000 | Gargas |
| 6,151,881 A | 11/2000 | Ai et al. |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1* | 4/2001 | Toney et al. ............ 95/277 |
| 6,227,379 B1 | 5/2001 | Nesseth |
| 6,277,278 B1 | 8/2001 | Conrad et al. |
| 6,312,021 B1 | 11/2001 | Thomas |
| 6,314,738 B1 | 11/2001 | Hays |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,394,764 B1 | 5/2002 | Samurin |
| 6,398,973 B1 | 6/2002 | Saunders et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Richards et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,616,719 B1 | 9/2003 | Sun et al. |
| 6,617,731 B1 | 9/2003 | Goodnick |
| 6,629,825 B2 | 10/2003 | Stickland |
| 6,631,617 B1 | 10/2003 | Dreiman et al. |
| 6,658,986 B2 | 12/2003 | Pitla et al. |
| 6,659,143 B1 | 12/2003 | Taylor et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,776,812 B2 | 8/2004 | Komura et al. |
| 6,802,693 B2 | 10/2004 | Reinfeld et al. |
| 6,802,881 B2* | 10/2004 | Illingworth et al. ............ 55/394 |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,878,187 B1 | 4/2005 | Hays et al. |
| 6,893,208 B2 | 5/2005 | Frosini et al. |
| 6,907,933 B2 | 6/2005 | Choi et al. |
| 6,979,358 B2 | 12/2005 | Ekker |
| 7,001,448 B1 | 2/2006 | West |
| 7,013,978 B2 | 3/2006 | Appleford et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter et al. |
| 7,258,713 B2 | 8/2007 | Eubank et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2* | 9/2009 | Harazim ............ 95/270 |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kolle |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,846,228 B1 | 12/2010 | Saaski et al. |
| 2001/0007283 A1 | 7/2001 | Johal et al. |
| 2002/0009361 A1 | 1/2002 | Reichert et al. |
| 2003/0029318 A1 | 2/2003 | Firey |
| 2003/0035718 A1 | 2/2003 | Langston et al. |
| 2003/0136094 A1* | 7/2003 | Illingworth et al. ............ 55/406 |
| 2004/0007261 A1 | 1/2004 | Cornwell |
| 2004/0170505 A1 | 9/2004 | Lenderink et al. |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0157251 A1 | 7/2006 | Stinessen et al. |
| 2006/0157406 A1 | 7/2006 | Maier |
| 2006/0193728 A1 | 8/2006 | Lindsey et al. |
| 2006/0222515 A1 | 10/2006 | Delmotte et al. |
| 2006/0230933 A1* | 10/2006 | Harazim ............ 95/270 |
| 2006/0239831 A1 | 10/2006 | Garris, Jr. |
| 2006/0254659 A1 | 11/2006 | Bellott et al. |
| 2006/0275160 A1 | 12/2006 | Leu et al. |
| 2007/0029091 A1 | 2/2007 | Stinessen et al. |
| 2007/0036646 A1 | 2/2007 | Nguyen et al. |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou et al. |
| 2007/0140870 A1 | 6/2007 | Fukanuma et al. |
| 2007/0151922 A1 | 7/2007 | Mian |
| 2007/0163215 A1 | 7/2007 | Lagerstadt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz |
| 2008/0031732 A1 | 2/2008 | Peer et al. |
| 2008/0039732 A9 | 2/2008 | Bowman |
| 2008/0246281 A1 | 10/2008 | Agrawal et al. |
| 2008/0315812 A1 | 12/2008 | Balboul |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0151928 A1 | 6/2009 | Lawson |

| | | | |
|---|---|---|---|
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1 | 2/2010 | Maier |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Kolle |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | |
|---|---|---|
| EP | 301285 | 10/1991 |
| EP | 1582703 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08 068501 | 3/1996 |
| JP | 08-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| WO | 1995024563 | 9/1995 |
| WO | 200117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US20071079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.

* cited by examiner

DUAL BODY DRUM FOR ROTARY SEPARATORS

The present invention relates to fluid machinery, and more particularly to rotary separator devices.

Fluid separators are known and are generally used to separate a mixed flow (e.g., solids and fluids, liquids and gases, etc.) into different phases of fluid, fluids of varying density, and/or to separate solids from fluids. One type of rotary separator includes a generally tubular drum connected with a rotatable shaft such that a fluid passage is defined between the drum and shaft. Fluid is directed into the passage and contacts either the shaft outer surface or the drum inner surface. During such contact, liquid separates from the fluid flow, such that a substantially gaseous portion of the flow is directed for subsequent processing or use, and the liquid portions are directed for collection.

SUMMARY OF THE INVENTION

In one aspect, the present invention is a drum for a rotary separator, the separator including a shaft rotatable about a central axis. The drum comprises an inner drum member having inner and outer circumferential surfaces and being disposed generally about the shaft such that a first flow passage is generally defined between the inner drum member inner surface and the shaft. The inner drum inner surface is configured to separate liquids from a fluid flow contacting the surface. An outer drum member has inner and outer circumferential surfaces and is disposed generally about the inner drum member such that a second flow passage is generally defined between the outer drum member inner surface and the inner drum member outer surface, the second flow passage being generally coaxial with the first flow passage. The outer drum inner surface is configured to separate liquids from a fluid flow contacting the surface.

In another aspect, the present invention is a rotary separator comprising a shaft rotatable about a central axis and an inner drum member having inner and outer circumferential surfaces and being disposed generally about the shaft. As such, a first flow passage is generally defined between the inner drum member inner surface and the shaft, the inner drum inner surface being configured to separate liquids from a fluid flow contacting the surface. An outer drum member has inner and outer circumferential surfaces and is disposed generally about the inner drum member such that a second flow passage is generally defined between the outer drum member inner surface and the inner drum member outer surface. The second flow passage is generally coaxial with the first flow passage, the outer drum inner surface being configured to separate liquids from a fluid flow contacting the surface.

In a further aspect, the present invention is again a drum for a rotary separator, the separator including a shaft rotatable about a central axis. The drum comprises an inner drum member including a generally tubular body having inner and outer circumferential surfaces and an inlet. The inner member body is disposed generally about the shaft such that a first flow passage is generally defined between the inner drum member inner surface and the shaft, the inner drum inner surface being configured to separate liquids from a fluid flow contacting the surface. An outer drum member includes a generally tubular body having inner and outer circumferential surfaces and an inlet, the outer member body being disposed generally about the inner drum member. As such, a second flow passage is generally defined between the outer drum member inner surface and the inner drum member outer surface and the outer member inlet being generally disposed circumferentially about the inner drum member inlet, the second flow passage is generally coaxial with the first flow passage. The outer drum inner surface is configured to separate liquids from a fluid flow contacting the surface. Further, the inner drum member inlet receives a first portion of fluid flow entering the separator and the outer drum member receives a second, remainder portion of the fluid flow.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
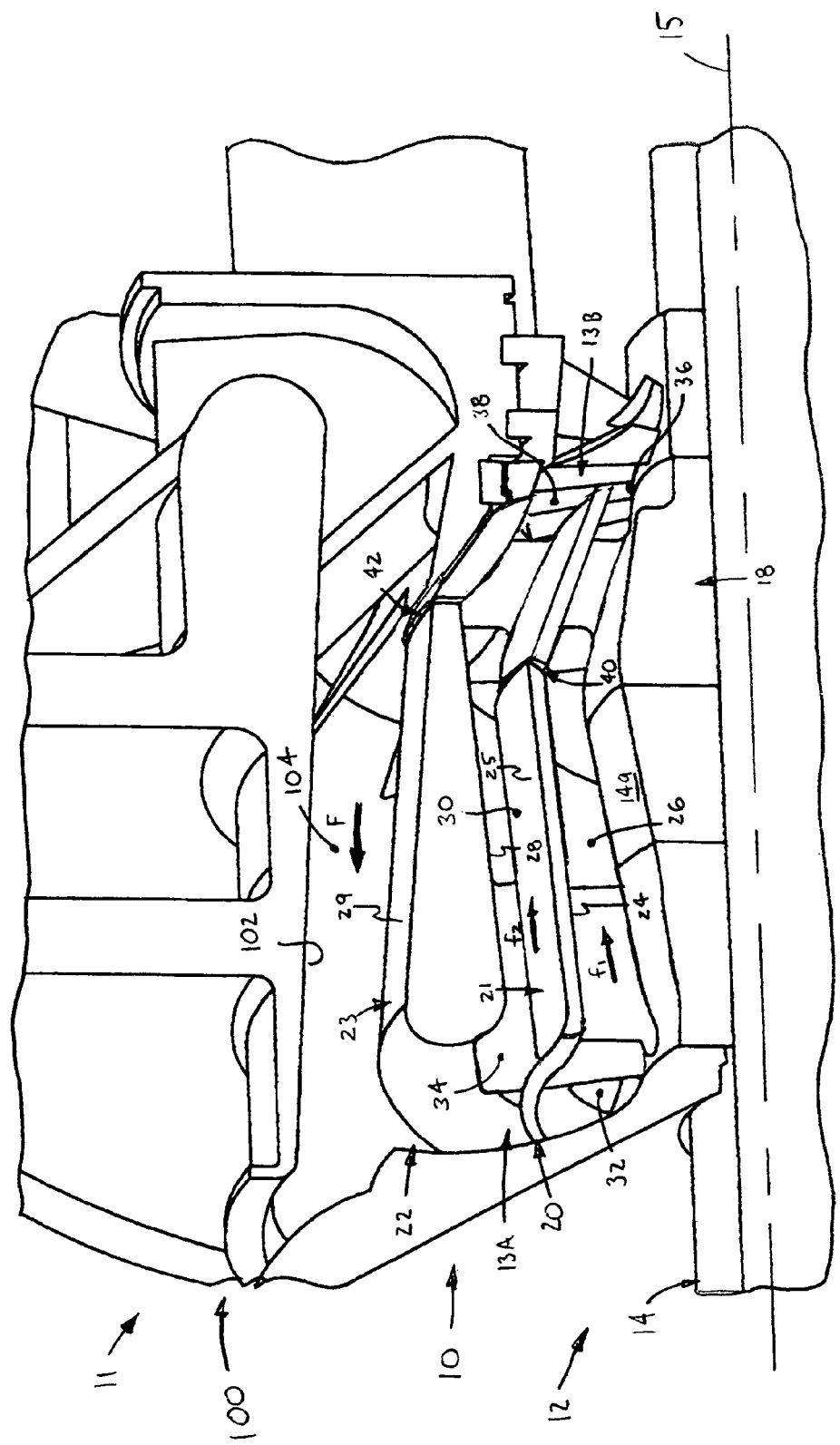
FIG. 1 is a broken-away, perspective view of an axial cross-section through a separator including a drum in accordance with the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-5 a drum 10 for a rotary separator 12, the separator 12 including a shaft 14 rotatable about a central axis 15 and preferably being part of a separator assembly 11. The drum 10 basically comprises an inner drum member 20 disposed about the shaft 14 and at least one "outer" drum member 22 disposed generally about the inner drum member 20, each member 20, 22 preferably including a generally tubular body 21, 23, respectively. At least one of the inner and outer drum members 20, 22 is directly connected with the shaft 14 and the other drum members 20, 22 is either connected with the one drum member 20 or 22 or with the shaft 14, as described in further detail below. As such, rotation of the shaft 14 rotates the inner and outer drum members 20, 22 about the axis 15 as a single unit.

The inner drum 20 has inner and outer circumferential surfaces 24, 25 and is spaced radially outwardly from the shaft 14 such that a first flow passage 26 is generally defined between the inner drum member inner surface 24 and an outer surface 14a of the shaft 14, preferably provided on a hub 18 mounted on the shaft 14. The inner drum inner surface 24 is configured to separate liquids from a fluid flow $f_1$ through the first passage 26 that contacts the surface 24. Also, the outer drum 22 has inner and outer circumferential surfaces 28, 29 and is spaced radially outwardly from the inner drum member 20. As such, a second flow passage 30 is generally defined between the outer drum member inner surface 28 and the inner drum member outer surface 25, the second flow passage 30 being generally coaxial with the first flow passage 26. Additionally, the outer drum inner surface 28 is configured to separate liquids from a fluid flow $f_2$ through the second passage 30 that contacts the surface 25.

Furthermore, each one of the inner and outer drum members 20, 22 has an inlet end or "inlet" 32, 34, respectively, and an outlet end or "outlet" 36, 38, respectively, spaced axially along the shaft 12 from the inlet 32, 34. As such, the two drum inlets 32, 34 define a separator inlet 13A and the two drum outlets 36, 38 define a separator outlet 13B. More specifically, the outer drum member inlet 34 is generally disposed circumferentially about the inner drum member inlet 32 and the outer drum member outlet 38 is generally disposed circumferentially about the inner drum member outlet 36, the two inlets 32, 34 and the two outlets 36, 38 thus being generally annular. With this coaxial arrangement, the inner and outer drum members 20, 22 are configured such that the inner drum member inlet 32 receives a first portion $f_1$ of fluid flow F entering the separator and the outer drum member inlet 34 receives a second, remainder portion $f_1$ of the fluid flow F.

By providing the two drum members 20, 22 and dividing the flow into two portions $f_1$, $f_2$, the radial extent of each passage 26, 30 is substantially lesser than a passage through a single drum sized similarly to the outer drum member 22. Further, the amount of separation surface area is substantially increased, specifically by the inner and outer surfaces 24, 25 of the inner drum member 20. Thus, the radial distance required for fluid flow to contact a rotating separation surface is substantially reduced, by approximately one-half, thereby either increasing the separation efficiency of the drum 10 or permitting the drum axial length to be reduced, in comparison with prior art "single drum" separators. Although the drum 10 is primarily described and depicted as including two (i.e., inner and outer) drum members 20, 22, the drum 10 may alternatively include three of more drum members (not depicted) so as to further increase the amount of separation surface, further reduce the radial extent of the flow passages, and/or further reduce the required axial length of the drum 10.

Still referring to FIGS. 1-5, each one of the inner and outer drum members 20, 22 further has at least one liquid outlet opening or passage 40, 42, respectively disposed generally centrally between the inlet end 32, 36, respectively, and the outlet end 34, 38, respectively. Each liquid outlet opening/passage 40, 42 extends generally radially between the drum member inner surface 24, 28, respectively, and the drum outer surface 25, 29, respectively. The outlet opening/passage 40 of the inner drum member 20 is configured to discharge liquid generally radially outwardly toward the outer drum member 22. Further, the outlet opening/passage 42 of the outer drum member 22 is configured to discharge liquid generally radially outwardly away from the drum 10, and preferably toward a static separator 100, as discussed below.

Figure 3:
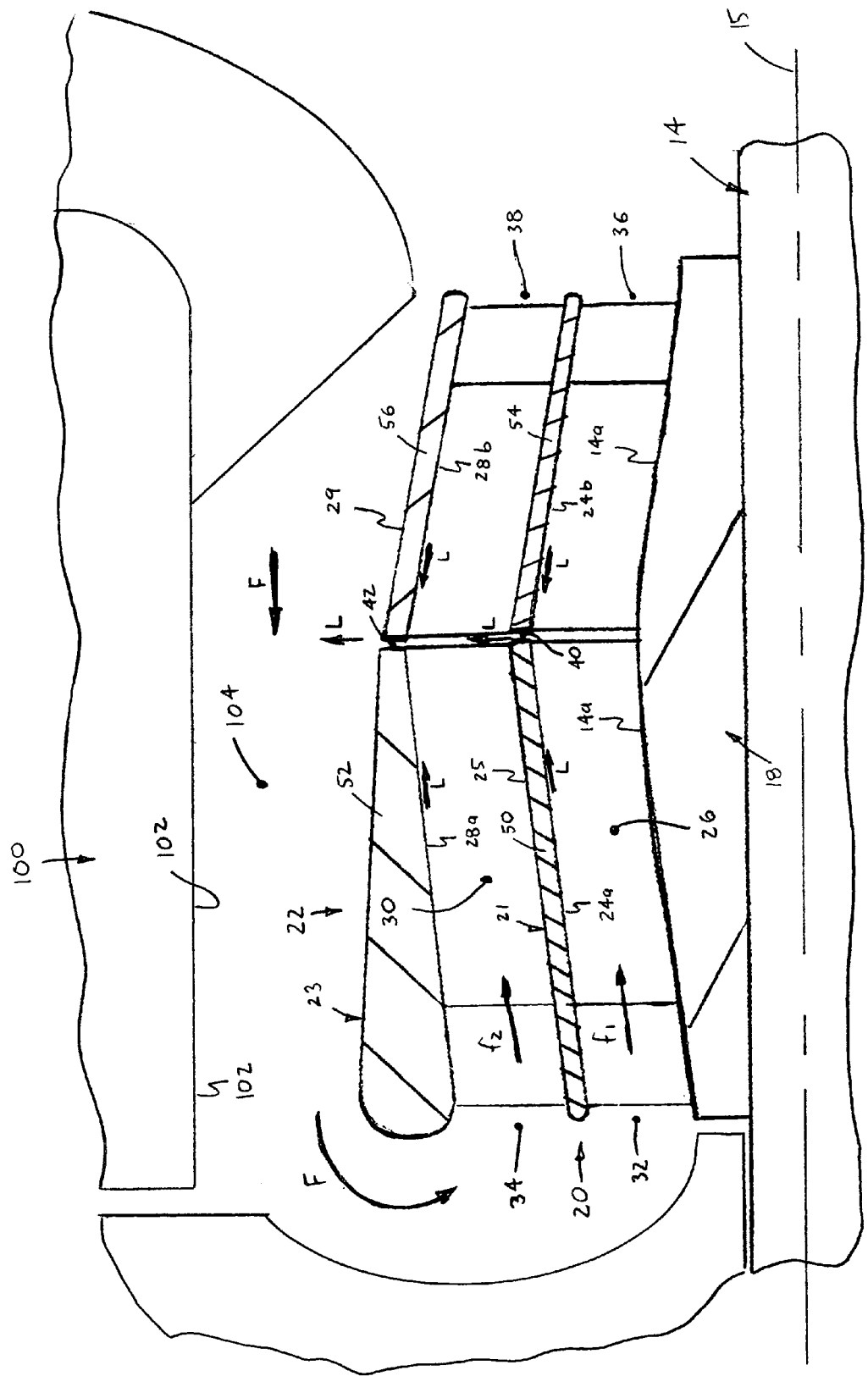
FIG. 3 is a broken-away, enlarged axial cross-sectional view of the separator and drum.

Referring particularly to FIG. 3, the inner drum member 20 is configured to direct liquid L contacting the inner drum member 20 generally radially outwardly toward the outer drum member 22. More specifically, liquid in the first flow portion $f_1$ contacting the inner surface 24 of the inner drum 20 separates from the remainder of the flow portion $f_1$ (i.e., gaseous portion). The liquid on the inner surface 24 is directed to flow toward the inner drum liquid outlet passage 40 by a combination of the inner surface geometry (as described below) and by centrifugal forces generated by the rotating drum member 20, and is thereafter discharged from the passage 40 toward the outer drum 22. Further, liquid in the second flow portion $f_2$ contacting the outer surface 25 of the inner drum 20 separates from the remainder of the flow portion $f_2$ and is thereafter directed or "flung" radially outwardly by centrifugal force.

Further, the outer drum member 22 is configured to direct liquid L contacting the outer drum 20 generally radially outwardly away from the drum 10, and preferably toward the static separator 100 as mentioned above and described in detail below, but may alternatively flow directly to a separate collector (not depicted). Specifically, liquid in the second, outer flow portion $f_2$ contacting the inner surface 28 of the outer drum 22 separates from the remainder of the flow portion $f_2$. Such separated liquid and liquid received from the inner drum member 20 is directed toward the liquid outlet passage 42 by a combination of the inner surface geometry (as described below) and by centrifugal forces generated by the rotating drum member 22. Thereafter, the liquid is discharged from the passage 40 outwardly from the drum 10 and toward the static separator 100. Furthermore, fluid in liquid flowing in a static passage 104, as described in second flow portion $f_2$ contacting the outer surface 25 of the inner drum 20 separates from the remainder of the flow portion $f_2$ and is thereafter directed or "flung" radially outwardly by centrifugal force.

Figure 2:
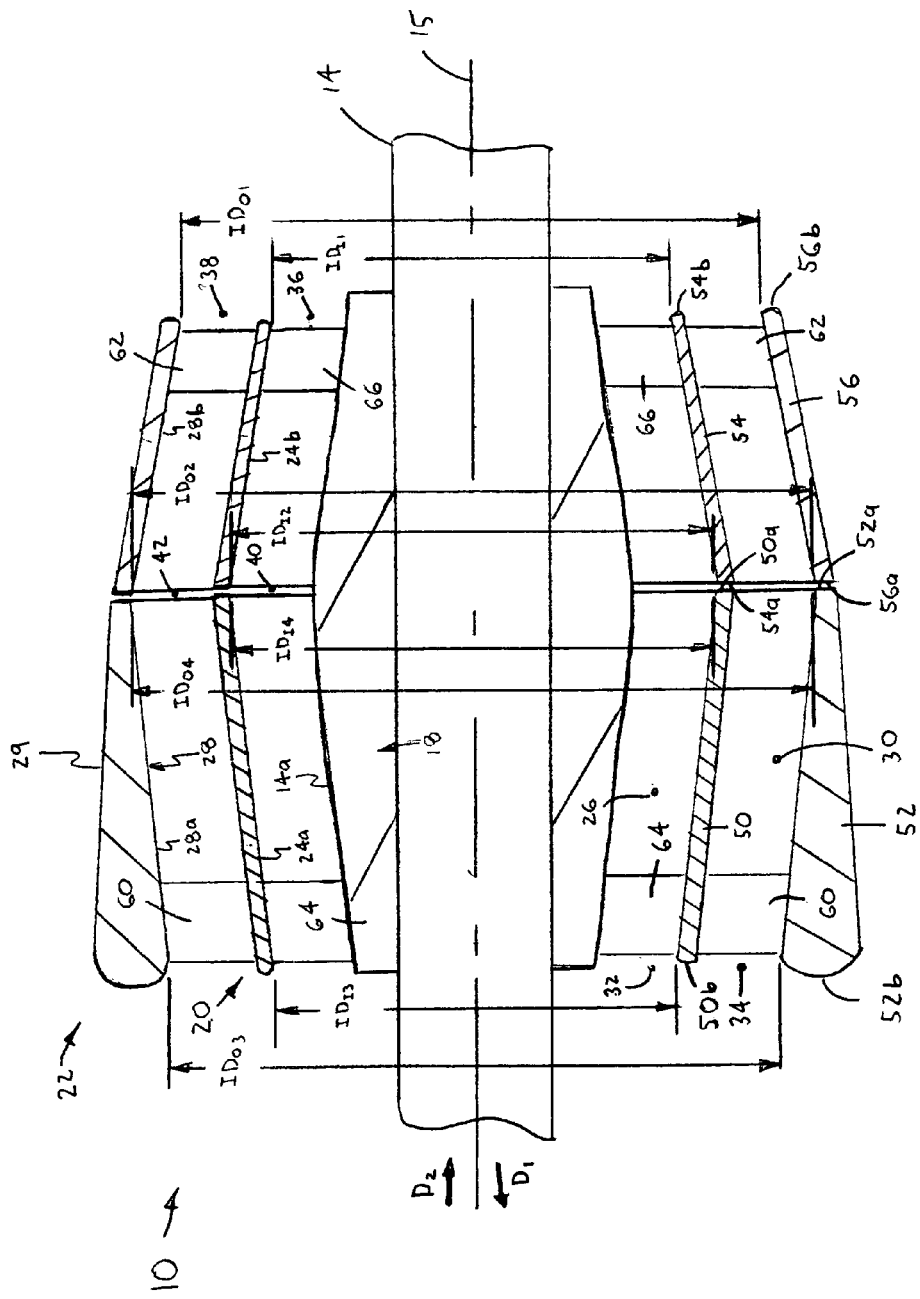
FIG. 2 is an axial cross-sectional view of a drum of the present invention in accordance with a first construction.

Referring now to FIGS. 1-3, in certain constructions, the tubular body 21, 23 of each drum member 20, 22 is substantially of two-piece construction. Specifically, each one of the inner and outer drum members 20, 22 includes a first tubular body section 50, 52, respectively, and a second tubular body section 54, 56, respectively, the two body sections 50, 54 and 52, 56 of each drum member 20, 22 being spaced apart along the axis 15. Each one of the first body sections 50, 52 has an inner end 50a, 52a and an outer end 50b, 52b and each one of the second body sections 54, 56 has an inner end 54a, 56a and an outer end 54b, 56b. The outer end 50b, 52b of each one of the first tubular body sections 50, 52 provides the drum member inlet end or inlet 32, 34, respectively, and the outer end 54b, 56b of each one of the second tubular body sections 54, 56 provides the drum member outlet end/outlet 36, 38, respectively.

Further, the four body sections 50, 52, 54, 56 are arranged such each first body section inner end 50a, 52a is disposed adjacent to the inner end 54a, 56a of the associated second body section 54, 56. Preferably, the adjacent inner ends 50a, 54a of the inner drum member body sections 50, 54 are spaced apart so as to define a generally annular gap providing the inner drum member liquid outlet 40, and the adjacent inner ends 52a, 56a of the outer drum member body sections 52, 56 are spaced apart so as to define a generally annular gap providing the outer drum member liquid outlet 42. As such, the two liquid outlets 40, 42 are preferably formed as generally annular, circumferential slots. Furthermore, the four body sections are relatively sized such that the liquid outlet passage 40 of the inner drum member 20 is located generally axially proximal to the outer drum member outlet 42, such that liquid discharged from the inner drum member 20 is directed onto the outer drum 22 at least generally proximal to the outlet 42.

Additionally, an inlet section 24a, 28a of each drum member inner surface 24, 28 is provided on the two first tubular body sections 50, 52 and an outlet section 24b, 28b of each drum member inner surface 24, 28 is provided on the two second tubular body sections 54, 56. At least the outlet surface sections 24b, 28b are each preferably generally angled so as to direct liquids on the body inner surface 24, 28 toward the body section inner end 54a, 56a, and thus away from the outlets 36, 38 and toward the liquid outlet passages 40, 42. Specifically, each second tubular body section 54, 56 has an inside diameter ID with a first value $ID_{f1}$, $ID_{O1}$ at the outer end 54b, 56b and a second value $ID_{f2}$, $ID_{O2}$ at the inner end 54a, 56a, the second value $ID_{f2}$, $ID_{O2}$ being greater than the first value $ID_{f1}$, $ID_{O1}$ and the value of the diameter ID generally increasing in a first direction $D_1$ along the axis 15 toward the inner end 54a, 56a. As such, the inner surface section 24b, 28b of each second body section 54, 56 is angled radially outwardly in the first direction $D_1$.

Still referring to FIGS. 1-3, the inlet surface sections 24a, 28a are also each preferably generally angled so as to direct liquids on the body inner surface 24, 28 toward the body section inner end 50a, 52a, and thus away from the inlets 32, 34 and toward the liquid outlet passages 40, 42. Specifically, each second tubular body section 50, 52 has an inside diameter ID with a third value $ID_{f3}$, $ID_{O3}$ at the outer end 50b, 52b and a fourth value $ID_{f4}$, $ID_{O4}$ at the inner end 50a, 52a, the fourth value $ID_{f4}$, $ID_{O4}$ being greater than the third value $ID_{f3}$, $ID_{O3}$ and the value of the diameter ID generally increasing in a second, opposing direction $D_2$ along the axis 15 toward the inner end 50a, 52a. Thus, the inner surface section 24a, 28a of each first body section 50, 52 is angled radially outwardly in the second direction $D_2$.

Further, with the two-piece drum member construction, the drum 10 further comprises at least one first connector 60 extending between and connecting the two first tubular body sections 50, 52 and at least one second connector 62 extending between and connecting the two second tubular body sections 54, 56, so as to thereby couple the inner and outer drum members 20, 22. Preferably, the drum 10 includes a plurality of the first connectors 60 disposed generally adjacent to the first body section outer ends 50b, 52b and a plurality of the second connectors 62 disposed generally adjacent to the second body section outlet ends 54b, 56b, both sets of connectors 60, 62 being spaced circumferentially about the axis 15. Furthermore, the drum 10 also comprises a plurality of third connectors 64 extending between and connecting the inner drum first tubular body section 50 with the shaft 14 and plurality of fourth connectors 66 extending between and connecting the inner drum second tubular body section 54 with the shaft 14, so as to thereby couple the inner and outer drum members 20, 22 with the shaft 14.

Figure 4:
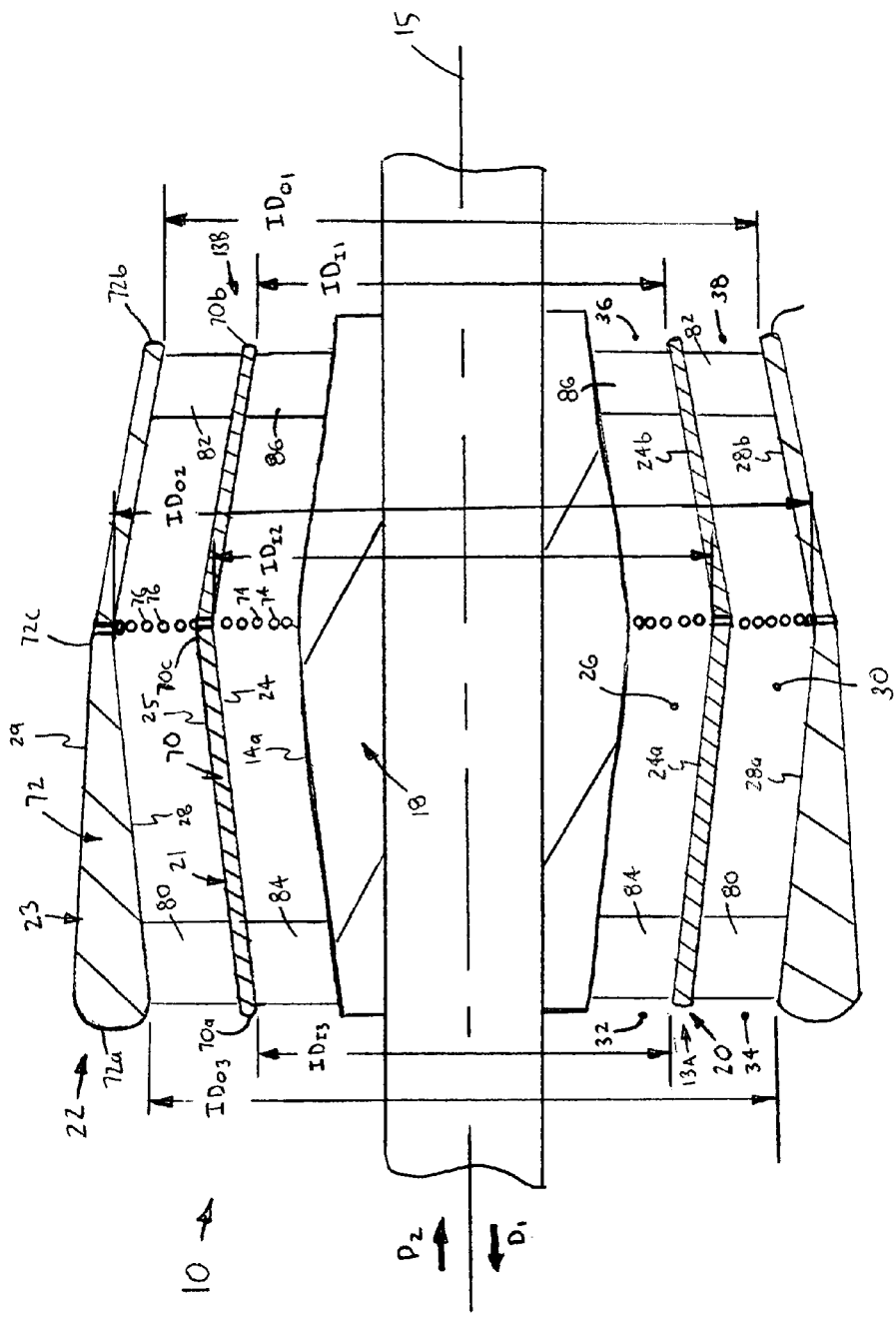
FIG. 4 is an axial cross-sectional view of a drum of the present invention in accordance with a second construction.

Referring particularly to FIG. 4, in one alternative construction of the two drum members 20, 22, the tubular bodies 21, 23 are formed as one-piece bodies 70, 72 that are generally similar to the two-piece construction as described in detail above, with the following differences. Each body 70, 72 has a first end 70a, 72a providing the drum inlet 32, 34 and an opposing end 70b, 72b, respectively, providing the drum outlet 36, 38, respectively, with an integral central portion 70c, 72c. Preferably, each drum tubular body 21, 23 includes one more holes 74, 76, most preferably a plurality of holes 74, 76 spaced circumferentially about the drum axis 15, which provide the liquid outlet passages 40, 42.

Further, at least an outlet surface section 24b, 28b of each drum body inner surface 24, 28 is preferably generally angled so as to direct liquids on the body inner surface 24, 28 toward the body central portion 70c, 72c, and thus away from the outlets 36, 38 and toward the liquid outlet passages 40, 42. Specifically, each tubular body 70, 72 has an inside diameter ID with a first value $ID_{f1}$, $ID_{O1}$ at the body second end 70b, 72b and a second value $ID_{f2}$, $ID_{O2}$ at the body central portion 21c, 23c, the second value $ID_{f2}$, $ID_{O2}$ being greater than the first value $ID_{f1}$, $ID_{O1}$ and the value of the diameter ID generally increasing in a first direction $D_1$ along the axis 15 toward the central portion 70c, 72c. As such, the inner surface section 24b, 28b of each tubular body 21, 23 angled radially outwardly in the first direction $D_1$.

Still referring to FIG. 4, an inlet surface section 24a, 28a of each drum member inner surface 24, 28 are also each preferably generally angled so as to direct liquids on the body inner surface 24, 28 toward the body central portion 70c, 72c, and thus away from the inlets 32, 34 and toward the liquid outlet passages 40, 42. Specifically, each tubular body 70, 72 has an inside diameter ID with a third value $ID_{f3}$, $ID_{O3}$ at the first end 70a, 72a, the second value $ID_2$, $ID_2$ being greater than the third value $ID_{f3}$, $ID_{O3}$ and the value of the diameter ID generally increasing in a second, opposing direction $D_2$ along the axis 15 toward the body central portion 70c, 72c. Thus, the inlet surface section 24a, 28a of each tubular body 70, 72 is angled radially outwardly in the second direction $D_2$.

Further, with the one-piece drum member construction, the drum 10 preferably further comprises at least one first connector 80 extending between and connecting the first ends 70a, 70b of the two tubular bodies 70, 72 and at least one second connector 82 extending between and connecting the second ends 70b, 72b of the two bodies 70, 72, so as to thereby couple the inner and outer drum members 20, 22. Preferably, the drum 10 includes a plurality of the first connectors 80 disposed generally adjacent to the body first ends 70a, 72a and a plurality of the second connectors 82 disposed generally adjacent to the body second ends 70b, 72b, both sets of connectors 80, 82 being spaced circumferentially about the axis 15. Furthermore, the drum 10 also comprises a plurality of third connectors 84 extending between and connecting the inner drum first end 70a with the shaft 14 and plurality of fourth connectors 86 extending between and connecting the inner drum second end 70b with the shaft 14, so as to thereby couple the inner and outer drum members 20, 22 with the shaft 14. Although four sets of connectors 80, 82, 84, 86 for coupling the inner and outer drum members 20, 22 and the inner drum member 20 with the shaft 14 are preferred, the drum 10 may include only two sets of connectors, one set for coupling the two drums and another set for coupling the inner drum (or outer drum) with the shaft 14 (structure not shown).

Figure 5:
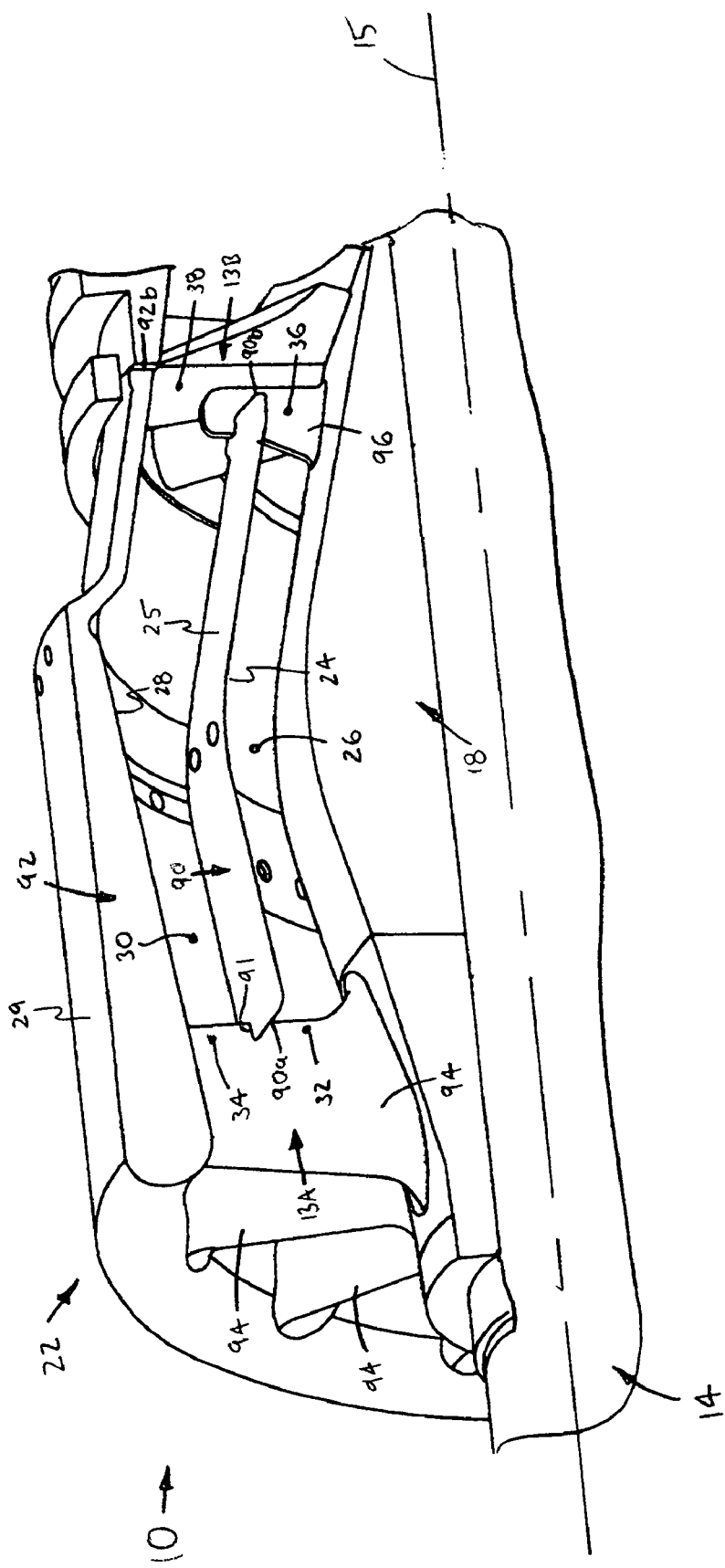
FIG. 5 is a broken-away, enlarged perspective view of an axial cross-section through a drum of the present invention in accordance with a third construction.

Referring specifically to FIG. 5, in another alternative construction of the drum members 20, 22, the two tubular drum bodies 21, 23 are once again of one-piece construction and include tubular bodies 90, 92 that are substantially similar to the bodies 70, 72, described above, with the following differences. Preferably, the outer drum body 92 is coupled with the shaft 14 by a plurality of connectors 94 extending radially between the shaft 14 and the body inner surface 23 and spaced circumferentially about the axis 15, which are preferably disposed adjacent to a body first end 92a. Further, the tubular body 90 of the inner drum member 20 is retrofitably connected with the plurality of connectors 94 so as to be disposed radially between the outer drum member 22 and the shaft 14. Specifically, a first end 90a of the inner body member 90 has a plurality of slots 91 (only one shown) which are configured to receive a portion of a separate one of the connectors 94. Thus, an existing one-piece drum may be retrofitted by adding the inner drum member 20 so as to form the drum 10 of the present invention.

Furthermore, the inner drum member body 90 also preferably includes one or more connectors 96 (only one shown) extend radially between a second end 90b of the body 90b and the shaft 14 so as to connect the second end 90b with the shaft 14. In the depicted structure, the second end 92b of the outer drum member body 92 is "free" or unconnected with the shaft 14, but may alternatively be directly attached to the shaft 14.

Although each of the above drum constructions is preferably configured to direct liquid L toward the center of each drum member 20 or 22, so as to be thereafter discharged through centrally located slots 40, 42 or holes 74, 76, each drum member 20 and/or 22 may alternatively be formed so as to direct liquid L toward either the member inlet 32, 34, respectively, or/and the member outlet 36, 38, respectively. As such, either or both of the inner and outer drum members 20, 22 may be formed with at least inner surfaces 24, 28 that slope "monotonically" toward either the inlet ends 32, 34 or the outlet ends 36, 38.

Referring now to FIGS. 1 and 3, the drum 10 is preferably used with a separator assembly 11 that includes a static member 100 disposed generally about the rotary separator 12. The static separation member 100 has a separation surface 102 extending circumferentially about and spaced radially outwardly from the outer drum member 22. With such a static member 100, the outer drum member 22 is configured to direct liquid at least generally radially outwardly toward the static separation surface 102. Further, an outer flow passage 104 is defined between the outer drum member 22 and the static member 100 which is fluidly coupled with the two drum inlets 32, 34. As such, liquid is separated from fluid flowing through the passage 104, either by contact with the static separation surface 102 or the outer drum member outer surface 29, and separated liquid on the drum outer surface 29 is directed or "flung" onto the static separation surface 102 for subsequent collection and drainage.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. An apparatus for separating a fluid, comprising:
   a shaft rotatable about a central axis;
   a rotary separator drum coupled to the shaft and configured to rotate therewith, the rotary separator drum comprising:
      an inner drum member having inner and outer circumferential surfaces and being disposed about the shaft such that a first flow passage is defined between the inner circumferential surface of the inner drum member and the shaft, the inner circumferential surface of the inner drum member being configured to separate liquids from a fluid flow contacting the inner circumferential surface of the inner drum member; and
      an outer drum member having inner and outer circumferential surfaces and being disposed about the inner drum member such that a second flow passage is defined between the inner circumferential surface of the outer drum member and the other circumferential surface of the inner drum member, the second flow passage being coaxial with the first flow passage, the inner circumferential surface of the outer drum member being configured to separate liquids from a fluid flow contacting the outer circumferential surface of the other drum member; and
      a static member in fluid communication with the rotary separator drum, the static member including a separation surface located upstream from the rotary separator drum and extending circumferentially about and spaced radially outward from the outer drum member.

2. The apparatus as recited in claim 1, wherein each one of the inner and outer drum members has an inlet, the inlet of the outer drum member being disposed circumferentially about the inlet of the inner drum member inlet, and the inner and outer drum members are configured such that the inlet of the inner drum member receives a first portion of fluid flow entering the rotary separator drum and the outer drum member receives a second, remainder portion of the fluid flow entering the rotary separator drum.

3. The apparatus as recited in claim 1, wherein the inner drum member is configured to direct liquid contacting the inner drum member radially outward and toward the outer drum member.

4. The apparatus as recited in claim 1, wherein each one of the inner and outer drum members has inlet and outlet ends and at least one outlet opening disposed centrally between the inlet and outlet ends and extending radially between the inner and outer circumferential surfaces of the inner and outer drum members, the outlet opening of the inner drum member being configured discharge liquid radially outward and toward the outer drum member and the outlet opening of the outer drum member being configured to discharge liquid radially outward and away from the drum.

5. The apparatus as recited in claim 1, wherein one of the inner and outer drum members is connected with the shaft and the other one of the inner and outer drum members is connected with one of the one drum member and the shaft such that rotation of the shaft rotates the inner and outer drum members about the central axis as a single unit.

6. The apparatus as recited in claim 1, wherein the outer drum member is connected with the shaft by a plurality of connectors and the inner drum member is retrofitably connected with the plurality of connectors so as to be disposed radially between the outer drum member and the shaft.

7. The apparatus as recited in claim 1, wherein each one of the inner and outer drums has an inlet end and outlet end, the two inlet ends defining a separator inlet and the two outlet ends defining a separator outlet.

8. The apparatus as recited in claim 1, wherein each one of the inner and outer drum members includes a tubular body.

9. The apparatus as recited in claim 1, wherein each one of the inner and outer drum members includes first and second tubular body sections spaced apart along the central axis, each one of the first and second body sections having an inner end disposed adjacent to the inner end of the other one of the first and second body sections and an opposing outer end, the outer end of each one of the first tubular body sections providing a drum member inlet end and the outer end of each one of the second tubular body sections providing a drum member outlet end.

10. The apparatus as recited in claim 9, wherein each second tubular body section has an inside diameter with a first value at the outer end and a second value at the inner end, the second value being greater than the first value and the value of the inside diameter increasing in a first direction along the central axis toward the inner end such that an inner surface section of each second body section is angled radially outward in the first direction so that liquid contacting the inner surface section is directed away from the drum member outlet end provided by the second tubular body section.

11. The apparatus as recited in claim 10, wherein each first tubular body section has an inside diameter with a third value at the outer end and a fourth value at the inner end, the fourth value being greater than the third value and the value of the inside diameter increasing in a second direction along the central axis toward the inner end such that the inner surface section of each first body section is angled radially outward in the second direction so that liquid contacting an inner surface section of the first tubular body section is directed away from the drum member inlet end provided by the first body section.

12. The apparatus as recited in claim 9, wherein a liquid outlet passage is defined between the inner ends of the first and second tubular body sections of each of the inner and outer drum members.

13. The apparatus as recited in claim 12, wherein the liquid outlet passage of the inner drum member is located axially proximal to the liquid outlet passage of the outer drum member.

14. The apparatus as recited in claim 9, further comprising at least one first connector extending between and connecting the two first tubular body sections of the inner and outer drum members and at least one second connector extending between and connecting the two second tubular body sections of the inner and outer drum members.

15. The apparatus as recited in claim 1, wherein the outer drum member is configured to direct liquid radially outward toward the separation surface of the static member.

16. The apparatus as recited in claim 1, wherein:
the outer drum member has inlet and outlet ends spaced along the central axis;
the rotary separator drum further comprises first and second sets of connectors extending radially between the shaft and the outer drum member and spaced circumferentially about the central axis, the first set of connectors being located adjacent to the inlet end of the outer drum and the second set of connectors being located adjacent to the outlet end of the outer drum member; and
the inner drum member has a first end connected with at least one of the connectors of the first set of connectors and a second end connected with at least one of the connectors of the second set of connectors.

17. A separator, comprising:
a shaft rotatable about a central axis;
a rotary separator drum coupled to the shaft and configured to rotate therewith, the rotary separator drum comprising:
an inner drum member having inner and outer circumferential surfaces and being disposed about the shaft such that a first flow passage is defined between the inner circumferential surface of the inner drum member and the shaft, the inner circumferential surface of the inner drum member being configured to separate liquids from a fluid flow contacting the inner circumferential surface of the inner drum member; and
an outer drum member having inner and outer circumferential surfaces and being disposed about the inner drum member such that a second flow passage is defined between the inner circumferential surface of the outer drum member and the outer circumferential surface of the inner drum member, the second flow passage being coaxial with the first flow passage, the inner circumferential surface of the outer drum member being configured to separate liquids from a fluid flow contacting the inner circumferential surface of the outer drum member; and
a static member in fluid communication with the rotary separator drum, the static member including a separation surface located upstream from the rotary separator drum and extending circumferentially about and spaced radially outward from the outer drum member.

18. The separator as recited in claim 17, wherein each one of the inner and outer drum members has an inlet, the inlet of the outer drum being disposed circumferentially about the inlet of the inner drum member, and the inner and outer drum members are configured such that the inlet of the inner drum member receives a first portion of fluid flow entering the rotary separator drum and the outer drum member receives a second, remainder portion of the fluid flow of fluid flow entering the rotary separator drum.

19. The separator as recited in claim 17, wherein one of the inner and outer drum members is connected with the shaft and the other one of the inner and outer drum members is connected with one of the one drum member and the shaft such that rotation of the shaft rotates the inner and outer drum members about the central axis as a single unit.

20. A separator, comprising:
a shaft rotatable about a central axis;
a rotary separator drum coupled to the shaft and configured to rotate therewith, the rotary separator comprising:
an inner drum member including a tubular body having inner and outer circumferential surfaces and an inlet, the tubular body of the inner drum member being disposed about the shaft such that a first flow passage is defined between the inner circumferential surface of the inner drum member and the shaft, the inner circumferential surface of the inner drum member being configured to separate liquids from a fluid flow contacting the inner circumferential surface of the inner drum member; and
an outer drum member including a tubular body having inner and outer circumferential surfaces and an inlet, the tubular body of the outer drum member being disposed about the inner drum member such that a second flow passage is defined between the inner circumferential surface of the outer drum member and the outer circumferential surface of the inner drum member and the inlet of the outer member being disposed circumferentially about the inlet of the inner drum member, the second flow passage being coaxial with the first flow passage, the inner circumferential surface of the outer drum member being configured to separate liquids from a fluid flow contacting the inner circumferential surface of the other drum member,
wherein the first flow passage receives a first portion of fluid flow entering the rotary separator drum and the second flow passage receives a second, remainder portion of the fluid flow; and
a static member in fluid communication with the rotary separator drum, the static member including a separation surface located upstream from the rotary separator drum and extending circumferentially about and spaced radially outward from the outer drum member.

21. The apparatus as recited in claim 1, wherein the separation surface of the static member and the outer circumferential surface of the outer drum member define a static separation zone therebetween.

22. The apparatus as recited in claim 21, wherein the static separation zone is configured so that fluid proceeds therethrough in a second axial direction and is turned to a first axial direction prior to entering the rotary separator drum.

23. The apparatus as recited in claim 21, wherein the separation surface and the rotary separator drum define a turn therebetween such that a fluid flow direction through the separation zone is turned from a second axial direction to a radial inward direction and then to a first axial direction, prior to entry into the rotary separator drum.

* * * * *